_United States Patent_ [19]

Schmidt et al.

[11] Patent Number: 4,969,255
[45] Date of Patent: Nov. 13, 1990

[54] APPARATUS FOR PRODUCING HEAT EXCHANGER TUBES

[75] Inventors: Martin Schmidt, Fröndenberg; Karl-Heinz Mayr; Fritz Fobbe, both of Menden, all of Fed. Rep. of Germany

[73] Assignee: KM-Schmöle GmbH, Menden, Fed. Rep. of Germany

[21] Appl. No.: 345,019

[22] Filed: Apr. 28, 1989

Related U.S. Application Data

[62] Division of Ser. No. 231/073, Aug. 11, 1988, Pat. No. 4,841,617.

[30] Foreign Application Priority Data

Aug. 11, 1987 [DE] Fed. Rep. of Germany ....... 3726677

[51] Int. Cl.$^5$ ............................................. B23P 15/26
[52] U.S. Cl. .................................. 29/726; 29/890.048; 29/890.054; 219/121.64; 219/121.85
[58] Field of Search ............... 29/157.3 AH, 157.3 A, 29/157.3 R, 157.4, 428, 726, 890.048, 890.054; 219/121.64, 121.63, 121.85

[56] References Cited

U.S. PATENT DOCUMENTS

| 2,004,387 | 6/1935 | Dewald | 29/33 G |
| 3,362,058 | 1/1968 | Morris et al. | 29/157.3 AH |
| 3,949,186 | 4/1976 | Nakayama et al. | 219/121.63 |
| 4,102,027 | 7/1978 | Greever et al. | 29/157.3 AH |
| 4,103,408 | 8/1978 | Joekel | 29/157.3 AH |
| 4,714,508 | 12/1987 | Chivens et al. | 219/121.64 |

FOREIGN PATENT DOCUMENTS

| 2147079 | 3/1972 | Fed. Rep. of Germany. | |
| 0048040 | 5/1978 | Japan | 219/121.64 |

Primary Examiner—Howard N. Goldberg
Assistant Examiner—Irene Cuda
Attorney, Agent, or Firm—Robert W. Becker & Associates

[57] ABSTRACT

An apparatus is provided for producing metallic heat exchanger tubes having a heat exchange surface that is increased by fins. A rotating tube has helically wound on its outer surface a strip that forms the fins, with this strip being fed to the tube surface under tension, and with the bottom edge of the strip being welded to the tube. The contact surface that exists between the tube and the bottom edge of the strip, and that extends helically on the surface of the tube, is fused exclusively at the surface of the tube with a laser beam that is directed in the region where the strip runs onto the surface of the tube, and that fuses a portion of the tube surface that in the axial direction of the tube corresponds at least to the width of the bottom edge of the strip and in the circumferential direction corresponds approximately to the same amount. At the same time, the laser beam fuses the bottom edge of the incoming strip in the region where the strip runs onto the surface of the tube. The fused surface areas are joined in a gap-free manner as the strip runs onto the tube, and are connected to one another to form a continuous, residual-gap-free welding.

17 Claims, 7 Drawing Sheets

APPARATUS FOR PRODUCING HEAT EXCHANGER TUBES

This is a divisional application of allowed co-pending parent application Ser. No. 231,073-Schmidt et al filed Aug. 11, 1988 now U.S. Pat. No. 4,841,617,-Schmidt et al dated June 27, 1989 belonging to the assignee of the present invention.

BACKGROUND OF THE INVENTION

The present invention relates to an apparatus for producing metallic heat exchanger tubes having a heat exchange surface that is increased by ribs or fins. Helically wound or wrapped on the outer surface of a rotating tube is a strip that forms the fins. The strip is fed to the tube surface under tension, with the bottom edge of the strip being welded to the tube.

A number of methods and apparatus for producing ribbed or finned heat exchanger tubes are known. Common to all of these methods and apparatus is that a strip is unwound from a supply roll and is wound in an upright state upon the German Offenlegunggschrift No. 21 47 079-Norris dated Mar. 23, 1972 discloses such a method, where to begin with the tube is wound with the strip, whereupon the wound strip is welded securely to the tube with a welding torch. However, this method has the drawback that a lot of thermal energy is introduced during the welding, as a result of which deformations result and the heat exchanger tubes become discolored. In addition, with this heretofore known method the weld seam is not symmetrical and is relatively large, because the thermal energy must be conveyed from one side of the strip, through the strip and through the wall of the tube to the welding joint A weld seam that completely welds the bottom edge of the strip to the surface of the tube therefore extends deep into the strip and into the wall of the tube, and reduces the strength factors of the heat exchanger tube, and with alloys can lead to segregation. These problems occur not only during high frequency welding using a high frequency electrical current, but also during electrical resistance welding. Another drawback with the heretofore known methods is that the strip is subjected to a plastic deformation that increases from the bottom edge of the strip to the outer edge of the strip. In this connection, care must be taken that no wavelike deformations, which are caused by compressive forces, occur on the bottom edge of a strip, because when the heat exchanger tube is used, these deformations would promote the deposition of dirt and moisture. In addition, no cracks caused by stretching stress that is too great can be allowed to occur on the outer edge of the strip, because these cracks on the one hand adverselY affect the service life of the tubes, and on the other hand can also lead to dirt and moisture deposits, which reduce the heat exchange effect. In order to increase the stability of the helically wound strip on the tube, it is known to provide the base edge of the wound strip with a short leg that projects at right angles and that increases the support surface of the strip upon the tube surface. Finally, published European application No. 0 259 607 proposes stretching the flat strip prior to winding it on the tube via two rollers in a conical roller gap in the longitudinal direction along the outer edge of the strip, and compressing the bottom edge of the strip, so that during the winding process neither deformations nor cracks are formed. With this method, the bottom edge of the strip is introduced into grooves that are previously formed in the tube surface, with the strip then being wedged in these grooves With this expensive method, gaps are necessarily formed on the surface of the tube; these gaps promote gap corrosion.

These heretofore known methods and apparatus for avoiding deformations and cracks in the strip all have the drawback that on the one hand a significant structural effort has to be expended for securing the strip in position upon the surface of the tube, and on the other hand as a result of this the speed at which the strip can be wound upon the outer surface of the tube is limited, so that on the whole the cost for producing such heat exchanger tubes is high.

It is therefore an object of the present invention to provide a method and an apparatus for producing heat exchanger tubes of the aforementioned general type whereby it is possible to weld any metallic materials in the tube and strip via small fusion zones and via the introduction of only a small amount of heat, all without adversely affecting the winding speed.

BRIEF DESCRIPTION OF THE DRAWINGS

This object, and other objects and advantages of the present invention, will appear more clearly from the following specification in conjunction with the accompanying schematic drawings, in which.

Summary of the Invention

Figure 1:
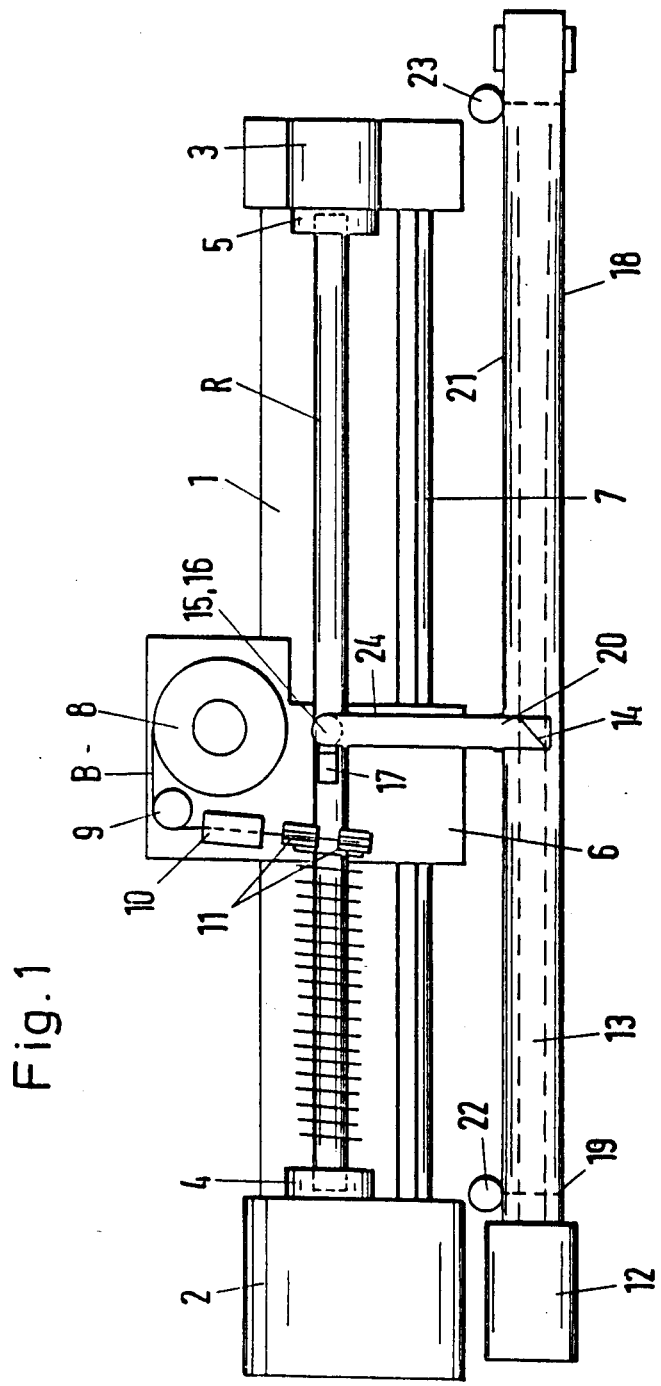
FIG. 1 is a plan view of one exemplary embodiment of the inventive apparatus.

The method of the present invention comprises the steps of: fusing the contact surface that exists between the tube and the bottom edge of the strip, and that extends helically on the surface of the tube, exclusively at the surface of the tube with a laser beam that is directed in the region where the strip runs onto the surface of the tube, and that fuses or melts a portion of the tub surface that in the axial direction of the tube corresponds at least to the width of the bottom edge of the strip and in the circumferential direction of the tube corresponds approximately to the same amount; at the same time fusing with the laser beam the bottom edge of the incoming strip exclusively in the region where the strip runs onto the surface of the tube; and joining the two fused surface areas of the tube surface and of the bottom edge of the strip in a gap-free manner as a consequence of the tension that is exerted upon the incoming strip as the same runs up on the tube surface, whereupon during subsequent cooling these two fused surface areas are connected to one another in such a way that a continuous, residual-gap-free welding of the helically wound strip with the tube results.

Thus, with the inventive method the laser beam is directed in the region where the strip runs up upon the surface of the tube, so that as a consequence of the finite dimensions of the laser beam in the circumferential direction of the tube, a gap formed between the strip and the tube surface is covered or embraced In so doing, the laser beam that is directed upon the surface of the tube cannot only pass into the gap via a channel fused into the strip, but can also be directed directly onto a lateral gap opening of the gap. Within this gap, a uniform thermal introduction results due to the reflection and absorption at the surface of the tube and at the bottom edge of the strip, so that an approximately symmetrical weld seam results.

The inventive method also has the advantage that during the production of heat exchanger tubes, metallic materials can for the first time be welded together regardless of the type of materials and in an economical manner. Since the fused zones both in the tube surface as well as at the bottom edge of the strip cover a small area and are not very deep, with the inventive method, due to the purely surface effect, a change in the structure and an embrittlement of the material is prevented; this is significant especially with regard to the fact that the tubes are in part stressed with very high pressures. Thus, the strength characteristics of the tube are practically not affected at all due to the small fusion zones. A further consequence of the small amount of heat introduction is that the inventively produced heat exchanger tubes have practically no discoloration.

Finally, the inventive method has the advantage that the tube and the bottom edge of the strip can be welded together without any supplemental material; in so doing, all contact corrosion is prevented since no element formation can occur within the electrode chemical series. Since with the inventive method the formation of gaps between the bottom edge of the strip and the surface of the tube is eliminated on the one hand all gap corrosion is reliably prevented, and on the other hand due to the strong connection between the tube and the strip, a very good heat conductivity is achieved that in particular leads to an increase of the fin efficiency and hence to a greater thermal transfer efficiency.

One preferred embodiment of the present invention proposes directing the laser beam in the region where the strip runs onto the tube surface directly into a gap opening of a gap between the strip and tube, or directly onto the tube surface adjacent the gap opening, so that the energy of the laser beam can be conveyed to the locations of the strip and tube that are to be welded via reflection and absorption at the tube surface and bottom edge of the strip adjacent to the gap without any particular losses. In contrast, laser power is unnecessarily utilized if the laser beam passes to the joint location between the strip and the tube through a channel fused into the wall of the strip. Pursuant to a further inventive embodiment, the laser beam is linearly polarized and the p-component of the laser beam, in the region where the strip runs onto the tube surface, is directed tangential to the tube surface and perpendicular to the axis of rotation of the tube. As a result, the component of the greatest reflection fraction of the laser beam can be reflected between the tube and the strip in order to effect a uniform thermal introduction and to generate a metal vapor channel for the welding. It is particularly advantageous in this connection if the laser beam is directed at an acute angle to the axis of rotation of the tube in the region where the strip runs onto the tube surface, because then the major portion of the incoming laser beam is reflected from the tube to the strip. With an angle of the laser beam relative to the axis of rotation of the tube of about 15° to 25°, the relationship of reflection and absorption between the tube and the strip is particularly favorable, with it also being possible to accommodate beam guides and focusing means for the laser beam at an appropriate distance from the tube.

Pursuant to a further feature of the inventive method, the laser beam is focused in such a way that it extends axially onto the tube surface at least below the entire bottom edge of the strip, so that the entire portion of the tube surface that is to be welded is reliably fused. The laser beam can reach the surface of the tube via the gap opening or a channel fused into the strip. The laser beam is additionally preferably focused in such a way that it embraces at least the entire width of the bottom edge of the strip, so that a complete fusion of the bottom edge of the strip is also assured. To completely and uniformly weld a tube, especially one that is to be provided with thicker strips, it has proven to be expedient, in the region where the strip runs up onto the tube surface, to direct the optical axis of the laser beam onto a gap opening that is disposed between the strip and the tube on that side of the strip remote from the incoming laser beam.

If a laser beam of a laser operated in the ring mode $TEM_{01}$ is used to weld a strip and a tube, a particularly high output can be introduced into the welding location despite repeated deflection of the beam and the presence of a focusing means.

In order to prevent diffusion or dispersion of the laser beam due to contaminants in the ambient air, and in order to avoid the power loss connected herewith, the laser beam is preferably conveyed, prior to the welding of the strip and the tube, in an inert gas, especially nitrogen. To protect the welding area from the ambient air, the region where the strip runs onto the tube during welding preferably has an inert gas, especially helium or argon, flow therearound. In this way, the formation of oxides during the welding process is prevented, so that a subsequent pickling of the heat exchanger tubes can be eliminated.

With apparatus for carrying out the inventive method, a holding and driving means, for supporting and permitting rotation of is used for holding a tube that is to have a strip wound therearound. A carriage is disposed on the holding and driving means, and is movable relative to the tube via a guide spindle. Disposed on the carriage are a strip supply roll, an alignment and braking device, and strip guides for the strip. This apparatus is inventively characterized in that at least one beam deflector is disposed on the carriage for the laser beam, which is generated by a laser that is fixed adjoining the holding and driving means, with the laser beam being directed onto the deflector to effect welding of the strip to the tube Via this inventive construction, it is possible, while using an existing holding and driving means and a fixed laser, to carry out the inventive method, for which purpose it is merely necessary to provide on the carriage, which moves in conformity with the winding speed and the pitch of the strip that is being wound, at least one beam deflector for the laser beam.

However, the apparatus could also be provided with a holding and driving means that holds at least the ends of a tube that is to have a strip wound therearound, and that rotates the tube about a longitudinal axis thereof, and can be provided with a winding means that includes a supply roll, an alignment and braking device, as well as strip guides for the strip. The holding and driving means moves the tube in the longitudinal direction thereof past the fixed winding means at a constant distance therefrom. A laser is fixed adjoining the winding means, and generates a laser beam that is directed directly, or indirectly via at least one deflector, onto the region where the strip runs onto the surface of the tube. This apparatus has the advantage that the distance between the laser and the welding area in the region where the strip runs onto the tube surface is constant, so that the adjustment problems involved with a moved guide for the laser beam, and possible changes in the beam intensity in the welding area, are eliminated. In addition, where the guide means for the laser beam are fixed, beam deflectors can be reduced or eliminated and the intensity losses connected with beam deflections can be reduced.

The principle of the present invention can already be realized with a single beam deflector, which always directs the incident laser beam at the same angle onto the welding area. Pursuant to one preferred embodiment of the present invention, a first beam deflector means receives the laser beam, and a further beam deflector means receives the laser beam reflected from the first beam deflector means and directs this reflected laser beam at the desired angle relative to the axis of rotation of the tube that is to be wound in the region where the band runs up onto the surface of the tube. In this way, a freedom of selection that is favorable for assembly, maintenance, and operation is achieved for the arrangement of the strip supply roll, the alignment and braking device, as well as the strip guides for the strip, and the laser beam can in a simple manner be directed at the preferred acute angle relative to the axis of rotation of the tube onto the region where the strip runs onto the tube.

Pursuant to one advantageous embodiment of the present invention, a focusing means is provided that concentrates or focuses the laser beam onto that region where the strip runs onto the surface of the tube; as a result a high intensity of the laser beam is achieved. With a holding and driving means that is similar to a lathe, the focusing means is preferably disposed upon the carriage. Particularly short lens focal lengths are achieved if the focusing means is disposed between the beam deflector means and the location where the strip runs up onto the tube that is to be wound, because the focusing means is then disposed directly next to the welding area, so that without a doubt the necessary threshold energy for plasma fusion is exceeded.

Pursuant to another preferred specific embodiment of the present invention, in order to optimize the welding process, not only the diameter of the laser beam but also the angle of incidence thereof on the surface of the tube are adjustable. If the optic axis of the laser beam is adjustable relative to the location where the strip runs onto the surface of the tube, the welding process could also be optimized for strips of varying thickness.

Pursuant to a further development of the present invention, the laser beam is conveyed from the laser parallel to the longitudinal axis of the tube and onto a beam deflector means that is inclined relative to this longitudinal axis, so that the laser beam, independent of the position of the carriage of a holding and driving means that is similar to a lathe, always strikes the same spot of the beam deflector means, and a constant output is always presented to the welding area. In this connection, it is particularly advantageous if the axis of the laser is oriented parallel to the longitudinal axis of the tube, because then a further beam deflector means, and the power loss and adjustment problems associated therewith, are eliminated.

The laser beam is preferably guided from the laser parallel to the longitudinal axis of the tube and through a guide channel that is fixed adjoining above the holding and driving means, with the guide channel or conduit having a band-like side wall, both ends of which can be wound upon fixed roll-type members or winding rollers, whereby the band-like side wall is anchored on the carriage so that during movement of the carriage the side wall is unwound from one winding roller and is wound onto the other winding roller. A beam deflector means of the carriage extends into the guide conduit, with the laser beam being delivered from the beam deflector means out of the guide conduit via an outlet opening of the band-like side wall. The guide conduit is first of all a safety mechanism that encloses the laser beam of high power density. In addition, the guide conduit prevents a disadvantageous diffusion of the laser beam due to dustlike impurities or pollution in the ambient air.

The band-like side wall can be forced onto the winding rollers of the guide conduit via lateral guides. However, the side wall can also be wound without having to fear the danger of a blockage if the winding rollers are provided with springs that preload the band-like side wall in the winding direction.

For safety reasons, and to prevent diffusion or dispersion, the laser beam on the carriage of a holding and driving means that is similar to a lathe, can be enclosed in a conduit guide means between the beam deflector means and the focusing means. For the same reasons, where a fixed winding means is provided, the laser beam can be enclosed in a conduit guide means between the laser and the tube. Diffusion of the laser beam is further reduced if the fixed guide conduit or conduit guide means are flushed with an inert gas that is at a slight pressure.

A laser beam having an adequate power density can be achieved with a $CO_2$-laser.

In order to facilitate orientation of an inert gas stream onto a welding area, a slotted nozzle that is provided for an inert gas and that surrounds the laser beam is disposed next to the location where the strip runs up onto the tube that is to be wound. This nozzle can be mechanically coupled with a beam deflector or a focusing device.

Finally, pursuant to another advantageous specific embodiment of the present invention, the alignment and braking device aligns the strip on the periphery of the tube that is to be wound at the desired pitch, and comprises two parallel plates that are spaced from one another approximately by the thickness of the strip and laterally guide the strip; the strip guides are provided with at least one guide disk set that comprises at least two guide disks that are mounted on a guide pin and are spaced from one another by approximately the thickness of the strip. These guide disks laterally guide the wound strip, and the guide pins are aligned in conformity with the desired pitch. With these guide means, wavelike distortions at the bottom edge of the strip are prevented in a structurally simple manner, so that in the region where the strip runs onto the surface of the tube, the laser beam maintains the position necessary for an optimum welding.

Further specific features of the present invention will be described in detail subsequently.

Description of Preferred Embodiments

Figure 2:
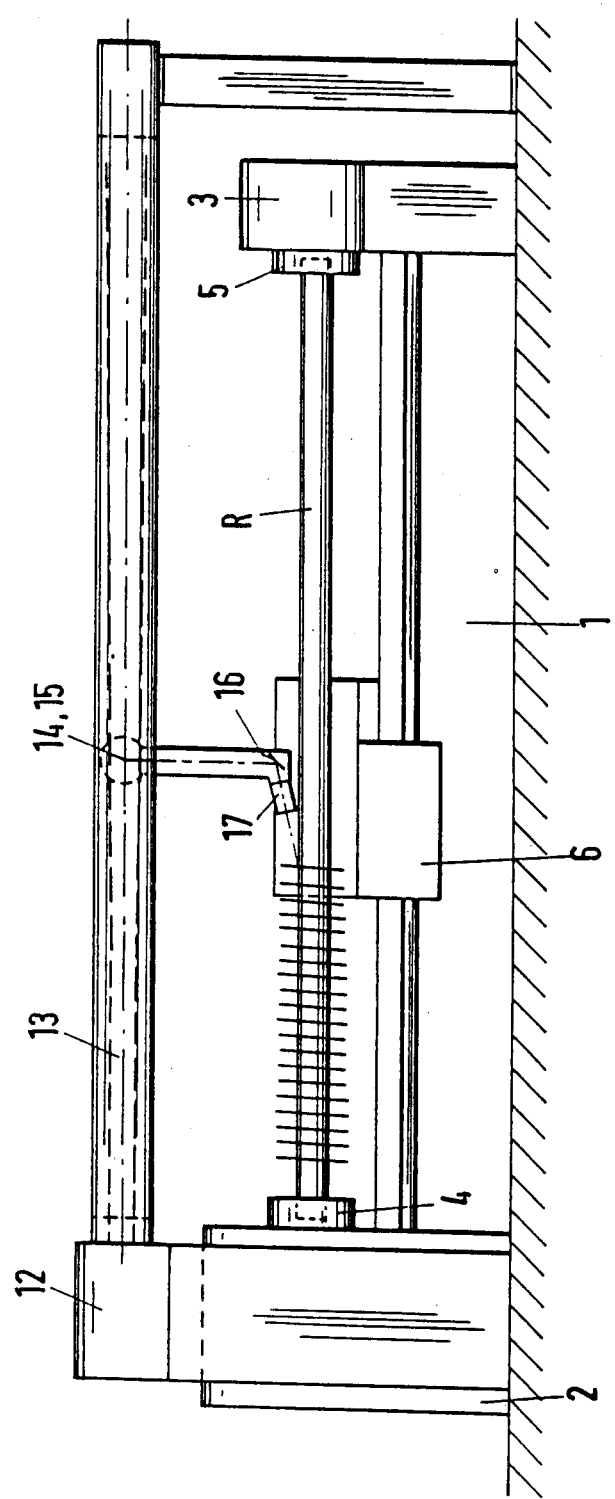
FIG. 2 is a front view of the apparatus of FIG. 1.

Referring now to the drawings in detail, the apparatus that is schematically illustrated in FIGS. 1 and 2 in plan and from the front, includes a base 1 that is provided with a carriage guide, with a drive and gear box 2 being disposed at one end of the base 1, and a head stock 3 being disposed at the other end of the base 1. So that a tube R that is to be wrapped or wound can be rotated, one end of the tube R is secured in a driven holding fixture 4 of the drive and gear box 2, while the other end of the tube R is secured in a non-driven holding fixture 5 of the head stock 3.

A carriage 6 is mounted on the carriage guide of the base 1 in such a way that it can be shifted longitudinally. Via a guide spindle 7, the carriage 6 is connected to the drive of the drive and gear box 2. In this manner, it is possible to drive the carriage 6 as a function of the speed of the holding fixture 4 and in conformitY with an adjustable pitch of the strip or rib B that is to be wound onto the tube R.

The strip B is withdrawn from a supply roll 8 that is disposed on the carriage 6 In the embodiment illustrated in FIG. 1, the strip B is fed via a guide roller 9 to an alignment and braking device 10 that on the one hand aligns the strip B that is to be wound, and on the other hand generates an adjustable braking action so that the strip B is fed to the tube R under tension. The feeding action is effected with the aid of strip guides 11 which, just like the alignment and braking device 10 and the guide roller 9, are disposed on the carriage 6 The alignment and braking device 10 and the strip guides 11 will be explained in detail subsequently with the aid of FIGS. 6 and 7.

Figure 3:
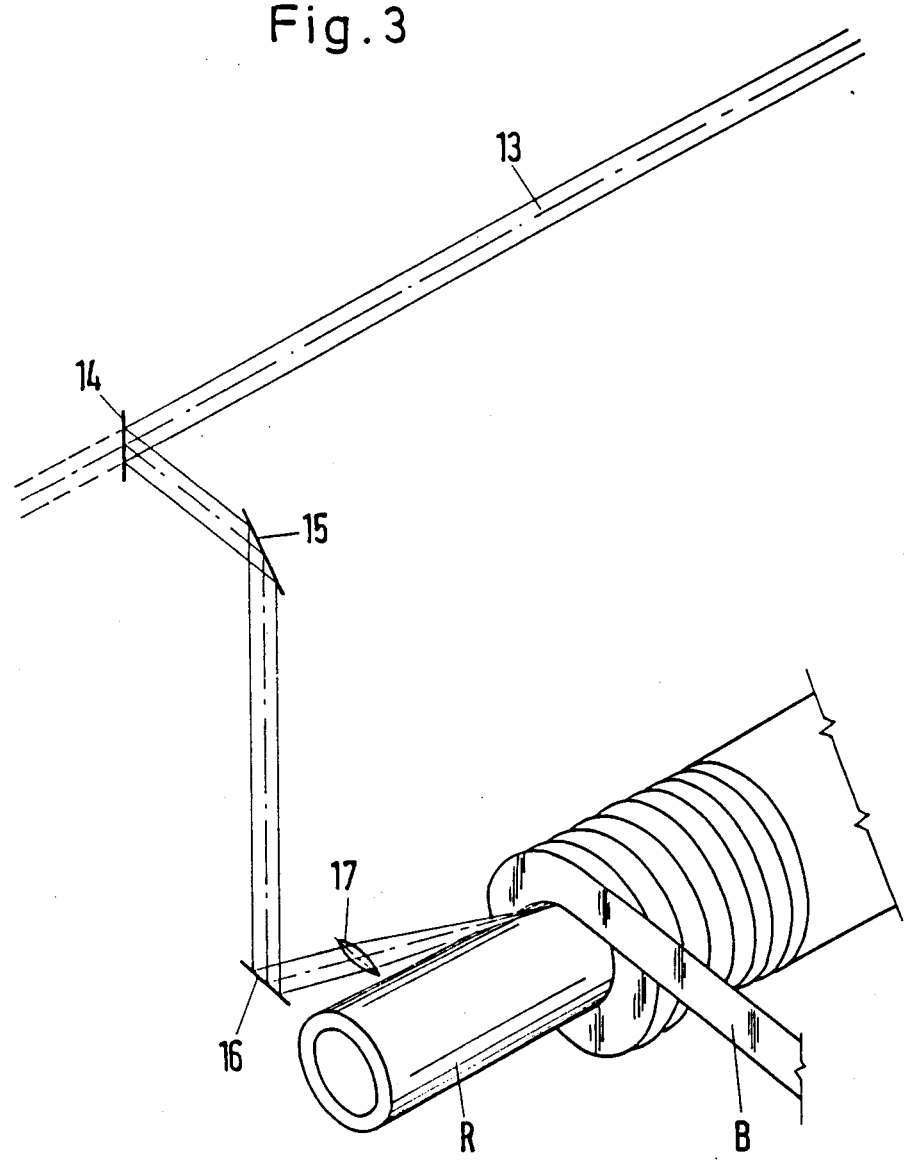
FIG. 3 is a perspective view of a tube upon which a strip is to be wound, including the laser beam that is to be used for the welding.

As can be seen from FIGS. 1 to 3, the strip B, the beginning of which is secured to the tube R, is helically wound upon the outer surface of the tube R when this tube is rotated with the aid of the drive mechanism accommodated in the drive and gear box 2, and when the carriage 6 is moved along the base 1, as a function of this rotational movement, at an adjustable feeding movement and via the guide spindle 7. In so doing, the strip B forms an endless rib or fin for increasing the heat exchange surface of the tube R.

In order to weld the strip B to the tube R along the helically extending contact surface of the strip B on the upper surface of the tube R, in the illustrated embodiment a $CO_2$-laser 12 is fixedly disposed to the side of and next to the drive and gear box 2; the laser beam 13 of the laser 12 extends parallel to the longitudinal axis of the tube R. The laser beam 13 strikes a first beam deflector means 14 that is disposed on the carriage 6 and that in the illustrated embodiment deflects the laser beam 13 by an angle of 90°, in other words, at right angles to the direction of movement of the carriage 6. After the first beam deflector means 14, the laser beam 13 strikes a second beam deflector means 15 that conveys the laser beam 13 to a further beam deflector means 16 that is disposed therebelow. The further beam deflector means 16 directs the laser beam 13 to a focusing means 17 that focuses the laser beam 13 onto the surface of the tube R in the vicinity of that location where the strip B that is to be wound onto the tube R comes into contact with the surface of this tube; this can best be seen in FIG. 3.

Via the three beam deflector means 14, 15, 16, an extensive freedom of selection for the disposition of the $CO_2$-laser 12 is achieved, which is disposed over the longitudinal axis of the tube R. With the advantageous orientation of the p-component of the linear polarized laser beam 13 tangential to the surface of the tube R and at right angles to the axis of rotation of this tube it should be noted that each beam deflector means 14, 15, 16 rotates the polarization plane by 90°. This can, if desired, be compensated for by an optical correction device of the $CO_2$-laser 12, or by a further beam deflector means.

The divergence of the laser beam 13 illustrated in FIGS. 1 and 2 is co-determinative for the diameter of the laser beam 13 upon the lens of the focusing means 17, and hence for the intensity of the laser beam at the focal point. The greatest possible intensity is achieved if the diameter of the laser beam fully engages or embraces the lens, and is not shadowed by the lens mount. Thus, the divergence of the laser beam limits the possible welding path because above a maximum beam diameter and below a minimum beam diameter on the lens of the focusing means 17, an adequate output for the generation or maintenance of the welding plasma is no longer available at the focal point. In order to obtain an adequate intensity of the laser beam 13 at the focal point of the focusing means 17, the laser 12 is additionally operated in the ring mode $TEM_{01}$, and a short lens focal length of 125 mm is provided.

For safety reasons, and in order to reduce power losses due to diffusion of the laser beam 13 via particlelike contamination in the ambient air the laser beam 18 is conveyed in a guide conduit 18 that is disposed parallel to the longitudinal axis of the tube R. The guide conduit 18 is completely closed except for an inlet 19 and an outlet 20 for the laser beam 13. The guide conduit 18 has a band-like side wall 21 that faces the carriage 6 of the apparatus. Both ends of the side wall 21 can be rolled or wound on fixed rollers 22, 23 that are provided with springs that tighten or preload the bandlike side wall 21 in a winding direction.

Extending into the outlet 20 of the side wall 21 is a conduit guide means 24 that is securely connected to the carriage 6, and that at the same time is a support for the beam deflector means 14, 15, 16 and the focusing means 17, and encloses the laser beam 13 between the beam deflector means 14, 15, 16 and the focusing means 17 When the carriage 6 is moved in the longitudinal direction of the tube R, the conduit guide means 24 takes the edge of the outlet 20 of the band-like side wall 21 along with it, thereby rolling the side wall 21 along and winding it on one of the roll-type members or winding rollers 22, 23, and rolling the side wall 21 along and unwinding it from the other roll-type member or winding roller 23, 22. In this manner, the laser beam 13 between the $CO_2$-laser 12 and the focusing means 17 remains closed off from the atmosphere over the entire path of movement of the carriage 6. In this connection, nitrogen as inert gas is introduced into the guide conduit 18 at a slight pressure. This nitrogen also flows into the conduit guide means 24 that extends into the guide conduit 18, thereby displacing possibly impure ambient air in the conduit means 24. Any leaks in the system are compensated for by a small amount of follow-up nitrogen.

Figure 4:
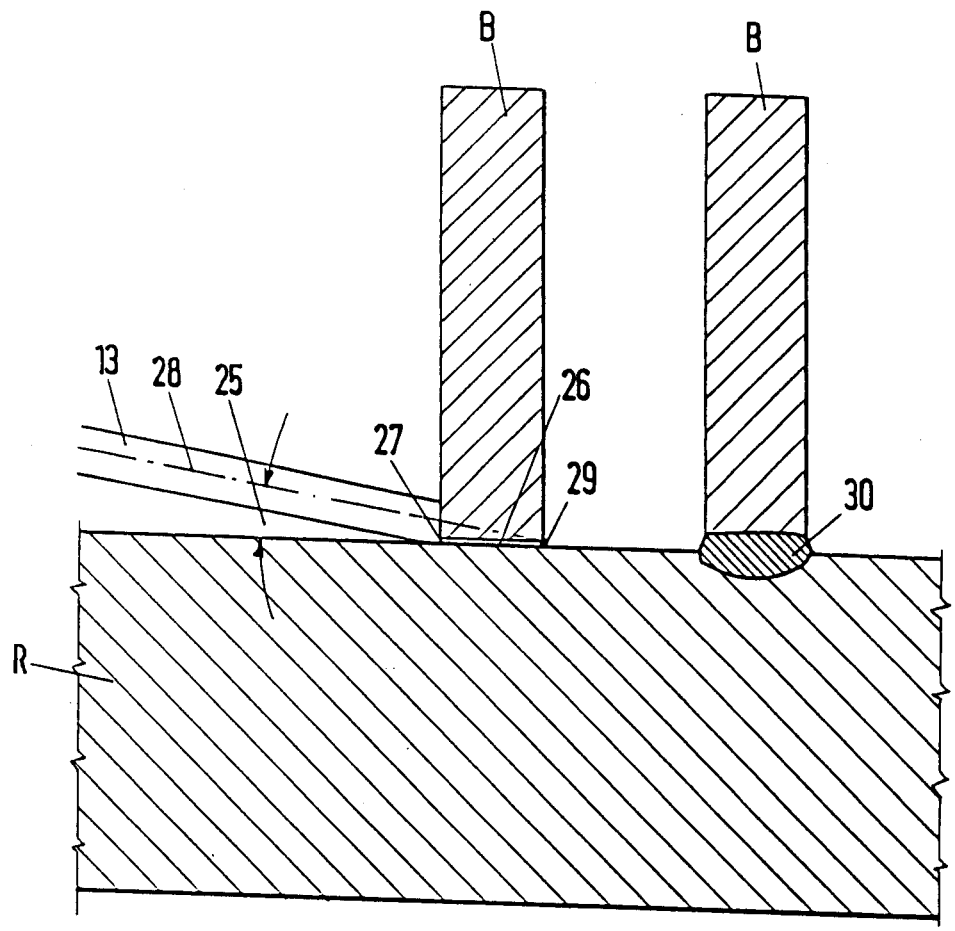
FIG. 4 is a longitudinal cross-sectional view through a portion of the tube that includes two fins, and also illustrates the laser beam that is directed at that location where the strip runs onto the tube.

As shown in particular in FIG. 4, the laser beam 13 strikes the surface of the tube R at an acute angle of incidence 25. The optimum angle of incidence 25 between the laser beam 13 and the longitudinal axis of the tube R is in the range of from 15° to 25°.

As a consequence of the focused laser beam 13, in the region where the strip B contacts the upper surface of the tube R a surface is covered that in the axial direction of the tube R corresponds at least to the width of the bottom edge of the strip B, and in the circumferential direction of the tube R corresponds approximately to the same amount. This point-type surface is melted or fused by the laser beam 18. In this connection, the fusing is effected exclusively at the surface of the tube R, so that as a consequence of the surface-like limitation and slight depth, no changes in the structure of the material of the tube and no embrittlement of the material occur. At the same time, along with the point-type surface on the tube surface, the bottom edge of the incoming strip B is also melted or fused by the laser beam 13, and in particular also exclusively in the region of the contact location. Thus, two point-type fused surface regions result, one on the upper surface of the tube R, and the other on the bottom edge of the strip B.

It is particularly advantageous, in the region where the strip B runs onto the tube R, for the laser beam 13 to strike a gap 26 that effects a uniform thermal introduction via reflection and adsorption of the laser beam 13. So that the laser beam 13 can penetrate the gap 26 more easily, this laser beam is directed directly onto a gap opening 27, or onto the surface of the tube R adjacent this gap opening. In addition, the optical axis 28 of the laser beam 13 is directed at a gap opening 29 that is formed on that side of the strip B that is opposite the incoming laser beam 13. In this way, the thermal introduction is improved, especially with thicker strips B. For an optimum reflection on the surface of the tube R, the p-component of the laser beam 13 is directed at right angles to the plane of the drawing of FIG. 4.

As a result of the tension that is exerted upon the incoming strip B, and that is adjustable at the alignment and braking device 10, the two point-type fused surface regions are joined in a gap-free manner as the strip B contacts or runs upon the tube R. During subsequent cooling during the rotational movement of the tube R, the two surface regions are connected to one another. Since the laser beam 13 is continuously directed upon the region where the strip B runs upon the surface of the tube R, consequently a continuous and residual-gap-free welding of the helically wound strip B with the rotating tube R without results any need to supply additional welding material, and without changes in structure or material embrittlement occurring at the tube R or the strip B.

The laser beam 13, which is directed at an acute angle of incidence 25 relative to the axis of rotation of the tube R in the region where the strip B runs upon the surface of the tube R, is focused by the focusing means 17 in such a way that the axial extension of the striking surface of the laser beam upon the tube surface is slightly greater than the width of the bottom edge of the strip B, and that the laser beam furthermore embraces the entire width of the bottom edge of the strip. There thus results a residual-gap-free welding that on the one hand prevents gap corrosion and on the other hand guarantees a good thermal conduction between the tube and the strip, thus increasing the rib or fin efficiency with the object of having a greater thermal transfer effectiveness.

Not only the diameter of the laser beam 13 but also the angle of incidence 25 of the laser beam upon the tube surface can be adjusted. Furthermore, it is possible to adjust the centerpoint of the laser beam 13 relative to where the strip B runs onto the surface of the tube R, so that this centerpoint of the laser beam 13 is directed either directly upon the run-up location or slightly ahead of or behind this location. The respective adjustment depends among other things upon the energy density and diameter of the laser beam 13 and upon the materials that ar to be joined.

Figure 5:
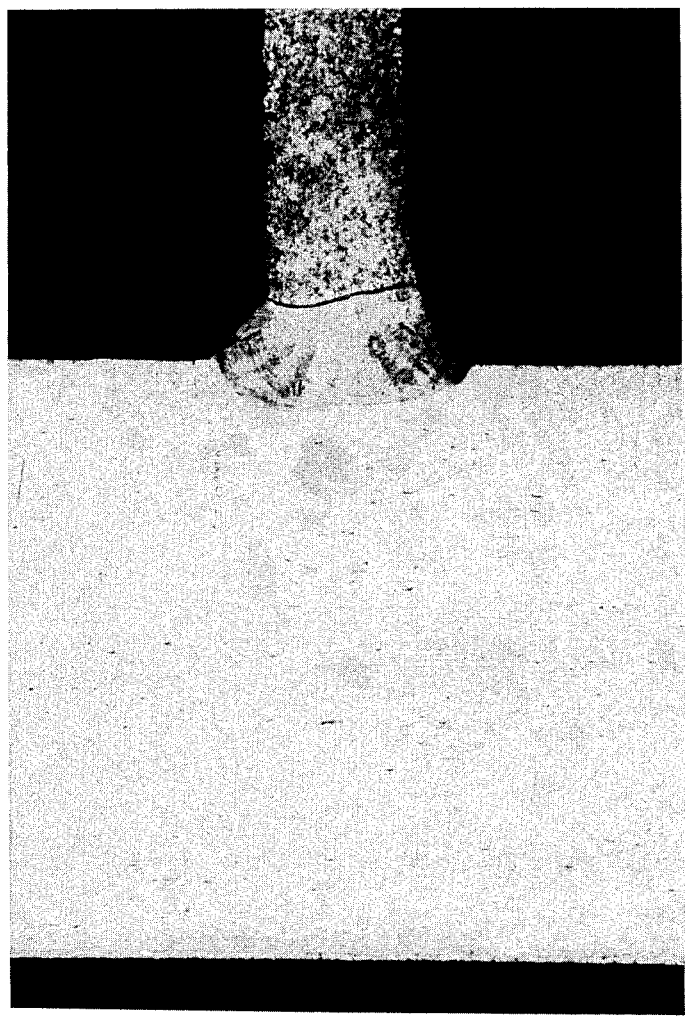
FIG. 5 is a micrograph that is a fifty times enlargement of the tube wall with a strip welded thereto.

With an optimum adjustment of the apparatus, there results as a consequence of the uniform thermal introduction a nearly symmetrical weld seam 30 that completely closes the gap 26 between the strip B and the tube R. As shown in particular in the micrograph of FIG. 5, the direction of incidence of the laser beam 13 can hardly be recognized. In this connection, the fused regions in the strip B and the tube R have approximately a constant penetration depth. The micrograph of FIG. 5 also clearly shows that the cross-sectional shapes of the tube R and of the strip B are practically not diminished by the weld seam 30, so that the strength factors of the tube R and the strip B are hardly changed.

Figure 6:
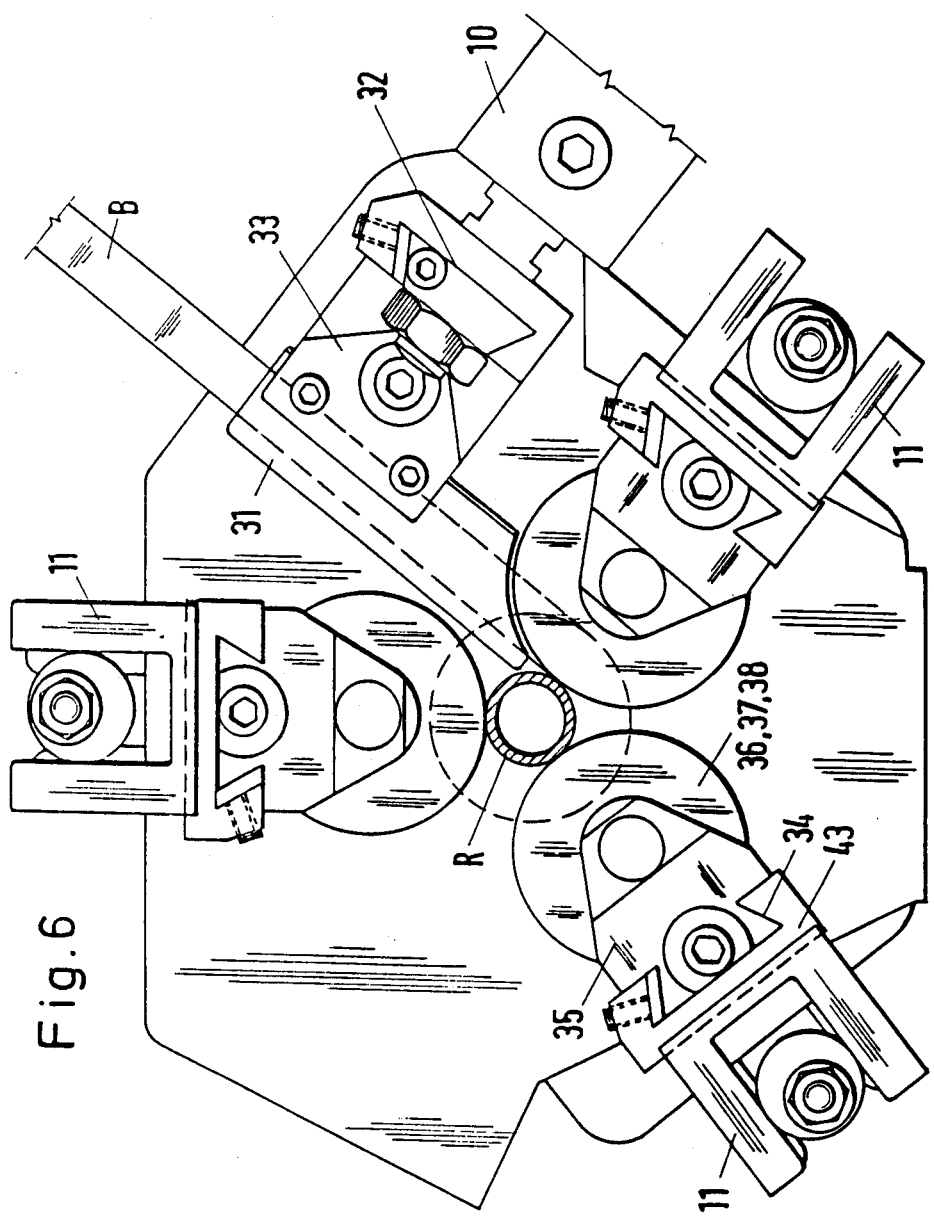
FIG. 6 is a side view of the guide means of the apparatus, and shows a strip introduction and three guide disk sets that are distributed about a tube.

As shown in FIG. 6, the alignment and braking device 10 for the strip B has two parallel plates 31 that are spaced from one another approximately by the thickness of the strip B, and that laterally guide the strip. In particular, the plates 31 tangentially guide the strip B at the desired angle to the tube R, and exert the desired tension upon the strip B via friction. To adjust the tension or to adapt to varying strip thicknesses, the spacing between the plates 31 is adjusted via a plate holder 33 that can be fixed in a dovetailed guide 32. The alignment and braking device 10, as well as the strip guides 11, which will be discussed in detail subsequently, are adjustably secured on the carriage 6 for the respective tube R that is to be wound and for the respective pitch of the ribs or fins that are to be wound.

Figure 7:
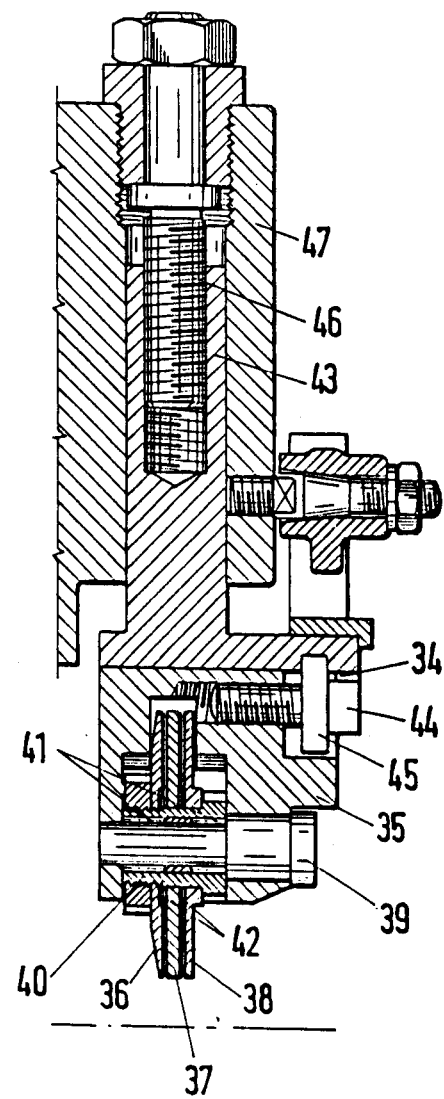
FIG. 7 is a longitudinal cross-sectional view through one of the guide disk sets of FIG. 6, showing three guide disks.

The strip guides 11 have a guide block 35 that is adjustably secured in a dovetailed guide 34; three guides disks 36, 37, 38 are rotatably mounted in the guide block 35. As shown in FIG. 7, the guide disks 36, 37, 38 are mounted via a needle or roller bearing 41 that is disposed between a guide pin 39 and a sleeve 40; ring-like spacers 42 are disposed between the two outer guide disks 36, 38 and the central guide disk 37. Thus, between the outer guide disks 36, 38 and the central guide disk 37 two guide gaps are formed that have a width approximately equal to that of the strip B that is to be welded. The guide disks 36, 37, 38 are finished flat and are subsequently chromium plated.

To adjust the guide block 35 in the dovetailed guide 34 of a guide disk holder 43, a set screw 44 is provided that is supported via a ring 45 on the guide disk holder 43. The guide disk holder, in turn, is adjustable in an upper part 47 via a spindle 46.

Three strip guides 11 are uniformly distributed about the periphery of the tube R. One of the strip guides 11 guides the strip B precisely to the contact or run-up location on the tube R. The strip B runs from the alignment and braking device 10 into the guide gap between the outer guide disk 36 and the central guide disk 37 of this strip guide 11 and is rotated by the tube R through the corresponding guide gaps of the two other strip guides 11. After one rotation, the strip B passes into the second guide gap between the central guide disk 37 and the outer guide disk 38 of the strip guide 11 disposed at the run-up location, and is further rotated by the corresponding guide gaps of the two other strip guides 11. By means of these strip guides 11, the strip B is wound onto the tube R without wave-like distortions occurring at the bottom edge of the strip This is true because the strip B is already guided at the run-up location and is forced into the desired shape by being rotated two times by the strip guides 11 that are distributed over the periphery of the tube R. By precisely orienting the strip B on the tube R, optimum edge conditions can be maintained for the welding operation with the laser beam.

With the previously described apparatus and method of the present invention, heat exchanger tubes can be produced where the tube R and the strip B are made of a desired metallic material. A typical example for such a heat exchanger tube is a steel tube having an outer diameter of 25.4 mm and a tube thickness of 2.3 mm. The outer diameter of the ribs or fins is 50.8 mm, with a strip thickness of 1.0 mm; five ribs or fins are distributed over each 25.4 mm of tube length. In another example, both the tube R and the strip B are made of stainless steel. With a uniform tube distribution and an outer diameter of the tube of 25.4 mm as well as an outer diameter of the fins of 50.8 mm, the thickness of the tube is 1.5 mm and the thickness of the strip is 0.4 mm in this example. With a conventional welding procedure, due to the large heat introduction zone a tube thickness of 2.4 mm had to be provided in order to obtain the same strength factors. Furthermore, with the inventive method it is possible to weld tubes with strips having a thickness of only 0.4 mm.

The present invention is, of course, in no way restricted to the specific disclosure of the specification and drawings, but also encompasses any modifications within the scope of the appended claims.

What we claim is:

1. An apparatus for producing metallic heat exchanger tubes having a heat exchange surface that is increased by fins, whereby a rotating tube has helically wound about its outer surface a strip that forms said fins, with said strip being fed to the surface of said tube under tension, and with the bottom edge of said strip being welded to said tube, said apparatus comprising:
   a holding and driving means for supporting and permitting rotation of a tube that is to have a strip wound therearound;
   a carriage that is disposed on said holding and driving means and is movable relative to said tube via a guide spindle, and on which carriage are disposed a strip supply roll an alignment and braking device, and strip guides for said strip;
   beam deflector means disposed on said carriage; and
   a laser that is fixed adjoining said holding and driving means, and that generates a laser beam which is directed onto said beam deflector means and effects said welding of said strip with said tube.

2. An apparatus according to claim 1, in which said beam deflector means includes a first beam deflector that receives said laser beam, and a second beam deflector that receives said laser beam as reflected from said first beam deflector and directs said reflected laser beam at a desired angle relative to the axis of rotation of said tube in the region where said strip runs onto the surface of said tube.

3. An apparatus according to claim 1, which includes focusing means for focusing said laser beam in said region where said strip runs onto said tube surface.

4. An apparatus according to claim 3, in which said focusing means is disposed between said beam deflector means and said region where said strip runs onto said tube surface.

5. An apparatus according to claim 3, which includes means for adjusting the diameter of said laser beam and the angle of incidence of said laser beam upon said tube surface.

6. An apparatus according to claim 3, which includes means for adjusting the optical axis of said laser beam relative to the region where said strip runs onto said tube surface.

7. An apparatus according to claim 3, which includes means for conveying said laser beam from said laser parallel to a longitudinal axis of said tube and onto a portion of said beam deflector means that is inclined relative to said longitudinal axis of said tube.

8. An apparatus according to claim 7, in which the axis of said laser is oriented parallel to said longitudinal axis of said tube.

9. An apparatus according to claim 7, in which said beam conveying means is a guide conduit that is fixed adjoining said holding and driving means, with said guide conduit including a band-like side wall having two ends that are adapted to be wound on fixed winding rollers, with said band-like side wall being anchored to said carriage so that when said carriage moves, said side wall is unwound from one winding roller and is wound up on the other winding roller; and in which said beam deflector means includes a portion that extends into said guide conduit, with said laser beam being delivered out of said guide conduit by said beam deflector means portion via an outlet opening in said band-like side wall.

10. An apparatus according to claim 9, in which said winding rollers are provided with springs that preload said band-like side wall in a winding direction.

11. An apparatus according to claim 9, in which said laser beam is enclosed in a conduit guide means that is disposed on said carriage between said beam deflector means portion and said focusing means.

12. An apparatus according to claim 11, in which said fixed guide conduit and said conduit guide means for said laser beam contain inert gas under a slight pressure 13. An apparatus according to claim 1, in which said laser is a $CO_2$-laser.

14. An apparatus according to claim 1, which includes, adjacent to where said strip runs onto said tube surface, a slotted nozzle that surrounds said laser beam and is provided for inert gas.

15. An apparatus according to claim 1, in which said alignment and braking device, which aligns said strip at the desired pitch relative to the surface of said tube, comprises two parallel plates that are spaced from one another approximately by the thickness of said strip and that laterally guide said strip; and in which said strip guides include at least one set of at least two guide disks that are mounted on a guide pin, are spaced from one another approximately by the thickness of said strip, and laterally guide said strip after the same has been wound onto said tube, with said guide pin being oriented in conformity with the desired pitch of said strip.

16. An apparatus for producing metallic heat exchanger tubes having a heat exchange surface that is increased by fins, whereby a rotating tube has helically wound about its outer surface a strip that forms said fins, with said strip being fed to the surface of said tube under tension, and with the bottom edge of said strip being welded to said tube, said apparatus comprising:
   a holding and driving means that holds at least the ends of a tube that is to have a strip wound therearound, and that rotates said tube about a longitudinal axis thereof;

winding means including a strip supply roll, an alignment and braking device, and strip guides for said strip, with said holding and driving means moving said tube in the longitudinal direction thereof past said fixed winding means at a constant distance therefrom; and a laser that is fixed adjoining said winding means, and that generates a laser beam that is selectively directed directly, or indirectly via deflector means, onto the region where said strip runs onto said tube surface.

17. An apparatus according to claim 16, which includes conduit guide means for enclosing said laser beam between said laser and said tube.

* * * * *